(12) United States Patent
Goto et al.

(10) Patent No.: US 8,080,084 B2
(45) Date of Patent: Dec. 20, 2011

(54) METHOD FOR RECYCLING STEELMAKING DUST

(75) Inventors: Shozo Goto, Iwata (JP); Katsutoshi Muramatsu, Kuwana (JP); Norio Misaki, Kurashiki (JP)

(73) Assignee: NTN Corporation, Osaka (JP)

( * ) Notice: Subject to any disclaimer, the term of this patent is extended or adjusted under 35 U.S.C. 154(b) by 48 days.

(21) Appl. No.: 12/294,390

(22) PCT Filed: Mar. 26, 2007

(86) PCT No.: PCT/JP2007/000293
§ 371 (c)(1),
(2), (4) Date: Sep. 24, 2008

(87) PCT Pub. No.: WO2007/116580
PCT Pub. Date: Oct. 18, 2007

(65) Prior Publication Data
US 2009/0165599 A1    Jul. 2, 2009

(30) Foreign Application Priority Data

Mar. 31, 2006    (JP) ................................ 2006-096260

(51) Int. Cl.
  C22B 1/14    (2006.01)
  C22B 1/24    (2006.01)
  C22B 1/242   (2006.01)
  C22B 1/245   (2006.01)
(52) U.S. Cl. ............................... 75/770; 75/746; 75/771
(58) Field of Classification Search .................... 75/746, 75/770, 771
See application file for complete search history.

(56) References Cited

U.S. PATENT DOCUMENTS

2004/0020326 A1    2/2004    Ibaraki et al.

FOREIGN PATENT DOCUMENTS

| CN | 1055955 A | 11/1991 |
| CN | 1473204 A | 2/2004 |
| JP | 6-145830 | 5/1994 |
| JP | 9-316512 | 12/1997 |
| JP | 11-152511 | 6/1999 |

(Continued)

OTHER PUBLICATIONS

English Language Translation of JP 2003-183716.*

(Continued)

*Primary Examiner* — James McDonough
*Assistant Examiner* — Jared Wood
(74) *Attorney, Agent, or Firm* — Osha • Liang LLP

(57) ABSTRACT

A method for recycling steelmaking dusts has a granulating step of mixing steelmaking dusts, containing as a principal component iron and oxides thereof produced during the steelmaking in a melting furnace, with a powder containing carbon as a principal component and granulating the resultant mixture to provide mixed granules, a water impregnating step of immersing the mixed granules in a water to allow them to be impregnated with the water, a solidifying step of molding the water impregnated, mixed granules under pressure within a mold assembly to provide a solid body of the steelmaking dusts, a step of transporting the solid body of the steelmaking dusts as a raw material to be charged into the melting furnace, an enhancing step of increasing the concentration of zinc in the dusts, and a dezincing step of dezincing the dusts during a period from acquisition of the steelmaking dusts out of the melting furnace to the solidifying step.

3 Claims, 3 Drawing Sheets

FOREIGN PATENT DOCUMENTS

| | | | |
|---|---|---|---|
| JP | 2002-194449 | | 7/2002 |
| JP | 2003-183716 | | 7/2003 |
| JP | 2003-183716 A | * | 7/2003 |
| WO | 02/36836 | | 5/2002 |

OTHER PUBLICATIONS

English translation of the PCT International Preliminary Report on Patentability and Written Opinion dated Oct. 30, 2008, for International Application No. PCT/JP2007/000293, previously submitted in the Information Disclosure Statement filed on Sep. 24, 2008. (6 pages).

International Search Report (English & Japanese) for PCT/JP2007/000293 mailed Jun. 19, 2007 (3 pages).

Patent Abstracts of Japan 2003-183716 dated Jul. 3, 2003 (1 page).

Patent Abstracts of Japan 06-145830 dated May 27, 1994 (1 page).

Patent Abstracts of Japan 11-152511 dated Jun. 8, 1999 (1 page).

Patent Abstracts of Japan 09-316512 dated Dec. 9, 1997 (1 page).

Patent Abstracts of Japan 2002-194449 dated Jul. 10, 2002 (1 page).

English abstract for Chinese Publication No. 1055955, publication date Nov. 6, 1991, SIPO database, (1 page).

Chinese Office Action for Application No. 200780010637.7, mailed on Feb. 12, 2010 (7 pages).

Office Action in Chinese Application No. 200780010637.7, Issued Feb. 1, 2011 (7 Pages With Partial Translation).

\* cited by examiner

METHOD FOR RECYCLING STEELMAKING DUST

BACKGROUND OF THE INVENTION

The present invention relates to a method for recycling steelmaking dusts, which makes it possible to reuse the steelmaking dusts, produced during the steelmaking in a melting furnace or the like, as a raw material to be charged into the melting furnace.

DESCRIPTION OF THE PRIOR ART

In the steelmaking, for example, the melting furnace, finely divided particles of iron and iron oxides are collected by a dust collector as dusts. Those dusts (hereinafter referred to as "steelmaking dusts") contain iron and iron oxides as a principal component and, therefore, reuse thereof is desired.

Those steelmaking dusts have hitherto been processed in one of the following ways:
1) Detoxification→Reclamation;
2) Injection into a melting furnace;
3) Briquetting a mixture of the steelmaking dusts with a binder and then injecting the resultant briquettes into a melting furnace directly or after having been reduced in a reducing furnace (Patent Documents 1 to 3); and
4) Melting the steelmaking dusts in a melting furnace to decompose the dusts into iron oxide and zinc so that the iron oxide can be supplied into a melting furnace or a reducing furnace and the zinc can be sold as a raw material for the zinc.

[Patent Document 1]
 Japanese Laid-open Patent Publication No. 11-152511
[Patent Document 2]
 Japanese Laid-open Patent Publication No. 09-316512
[Patent Document 3]
 Japanese Laid-open Patent Publication No. 2002-194449

It has however been found that any of those processing has their own problems.
1) High cost of reclamation and depletion of reclaimed grounds.
2) Low melting efficiency because of scattering of the dusts.
3) Use of the binder results in increase of the cost and the workability is low because of clag of the binder during molding.
4) Bulky equipments are required, resulting in a high cost.

In view of the foregoing, an inexpensive recycling method has been desired for.

SUMMARY OF THE INVENTION

In view of the foregoing, the present invention is intended to provide a method of recycling the steelmaking dusts, which method makes it possible to reuse inexpensively, the steelmaking dusts produced during the steelmaking as a raw material for steelmaking.

In order to accomplish the foregoing object, the steelmaking dust recycling method of the present invention includes a granulating step of mixing steelmaking dusts, containing as a principal component iron and oxides thereof produced during the steelmaking in a melting furnace, with a powder containing carbon as a principal component and granulating the resultant mixture to provide mixed granules, a water impregnating step of immersing the mixed granules in a water to allow them to be impregnated with the water, a solidifying step of molding the water impregnated, mixed granules under pressure within a mold assembly to provide a solid body of the steelmaking dusts, a step of transporting the solid body of the steelmaking dusts as a raw material to be charged into the melting furnace, and a dezincing step of dezincing the dusts, in which the concentration of zinc has been enhanced, during a period from acquisition of the steelmaking dusts out of the melting furnace to the solidifying step.

According to the recycling method of the present invention, the steelmaking dusts are solidified to provide the solid body and, therefore, as compared with the case in which the dusts are reused in a powdery form as they stand, there is no problem associated with scattering thereof at the time when the dusts are charged into a furnace and, also, as compared with the case in which the dusts are granulated to provide small briquettes, the handling is good because of a substantial size. Also, since the steelmaking dusts are solidified to provide the solid body after granulation thereof, a high molding density can be obtained as compared with that exhibited when the steelmaking dusts are charged in a powdery form as they stand and compacted in a mold assembly under pressure, and, hence, even without a reinforcing agent such as, for example, a binder being used, the practically sufficiently acceptable strength of the solid body of the steelmaking dusts can be obtained.

In particular, since the mixed granules, formed by granulating a powdery material containing as a principal component the steelmaking dusts and carbon that are mixed together, are used as a raw material, there are advantages that heat efficiency in a furnace can be improved by addition of the powdery material containing carbon as a principal component, and that the steelmaking dusts can be charged into the mold assembly in the form as granulated and can then be molded under pressure within the mold assembly. Because of this, with no additive employed if possible, a practically sufficient strength can be effectively available and it can lead to an improvement in heat efficiency of the furnace at the time of reloading into the furnace.

Also, since water is impregnated before molding, the mixed granules can have their surfaces softened to such an extent that the granules can easily deform when held under pressure and, in view of the fact that the bonding strength among the granules increases, a favorable molding strength can be obtained.

In addition, in the case where as a raw material to be charged into a furnace, scrap of, for example, plated and galvanized steel sheets is used, repetition of a recycle of returning the solid body into the melting furnace results in concentration of zinc in the dusts with the zinc concentration enhanced consequently, and the dezincing treatment is carried out at that time. By so doing, the dezincing treatment can be accomplished efficiently.

Because of those reasons discussed above, a recycling method, which is stable at a low cost, can be embodied and the amount of industrial wastes can be reduced.

In the recycling method of the present invention, the carbon content in the mixed granules is preferably within the range of 15 to 20% by weight and the water content is preferably within the range of 8 to 10%. According to the result of test, in order to secure a good molding strength as the solid body of the steelmaking dusts, it has been ascertained that the above described ranges of the carbon and water contents are found to be effective.

In the steelmaking dusts recycling method of the present invention, during the dezincing step, improvement of the efficiency of dezincing treatment and reduction of the amount of dezincing treatment may be made by enhancing the zinc concentration.

The advantages of the present invention are summarized as follows:
1) Iron contained in the steelmaking dusts can be reused and, hence, the raw material can be economized.
2) Since the granulating step involves mixing of carbon and the carbon so mixed acts as a reducing agent and fuel, the steelmaking dusts can be efficiently melted and reduced and, accordingly, the efficiency of the melting furnace is high as compared with the case in which only the steelmaking dusts are recycled.
3) Since molding is performed subsequent to the granulation, the granulating conditions and the forming conditions can be properly selected, and as a result, the molding can be accomplished inexpensively and with no solidification subsidiary material being used.
4) Since water is impregnated immediately before the molding, a more favorable molding strength can be obtained.
5) Since the solid body of the steelmaking dusts has a sufficient size, the steelmaking dusts can be efficiently melted without being blown up.
6) Where the raw material contains zinc, such zinc can be concentrated in the dusts and the dezincing treatment is necessitated at the time of reclamation or the reuse, but since with the instant method for recycling the steelmaking dusts, the dezincing treatment is carried out in a condition with the zinc concentration further enhanced, the dezincing treatment can be accomplished efficiently.
7) Because of those reasons discussed above, a recycling method, which is stable at a low cost, can be embodied and the amount of industrial wastes can be reduced.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENT

Figure 1:
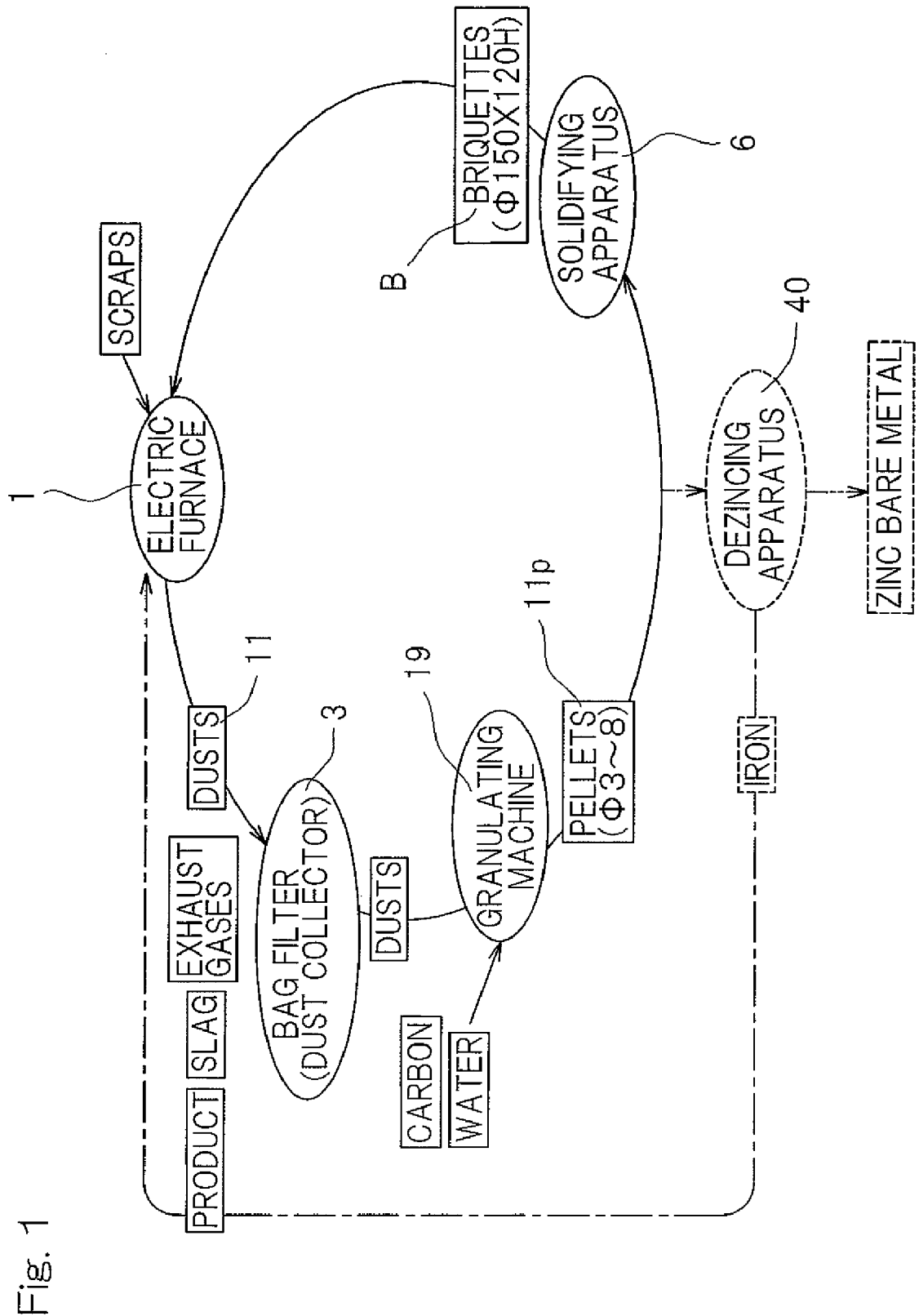
FIG. 1 is an explanatory diagram showing a conceptual construction of a method for recycling steelmaking dusts in accordance with a preferred embodiment of the present invention.

A preferred embodiment of the present invention will now be described in detail with reference to FIGS. 1 to 4. FIG. 1 illustrates a conceptual construction of a method for recycling steelmaking dusts according to this embodiment. In a melting furnace 1 such as, for example, an electric furnace or any other melting furnace, scraps and/or solid bodies B of steelmaking dusts (which bodies are hereinafter referred to as "briquettes") made by the recycling method of the present invention are charged thereinto as a raw material, and products along with slag, exhaust gases and steelmaking dusts 11 are discharged therefrom. The main raw material to be charged into the melting furnace 1 is pig iron discharged from a blast furnace and, as an auxiliary feedstock, scraps referred to above and/or calcined lime are used. The scraps referred to above includes those containing a zinc component, such as that in a plated and galvanized steel sheet. The steelmaking dusts 11 produced from the melting furnace 1 are introduced together with exhaust gases into a dust collector 3 including a bag filter, and the steelmaking dusts 1 contained in the exhaust gases are, after having been collected by the dust collector 3, discharged in the form of a powdery material. The steelmaking dusts 11 contain, as a principal component, iron and oxides of iron.

The steelmaking dusts 11 discharged from the dust collector 3 contains a mixture of water and carbon (a powder of carbon) and are granulated by a granulating machine 19 to provide spherical mixed granules or pellets 11p of 3 to 8 mm in diameter. Those pellets 11p, when the concentration of zinc is high, may be dezinced in a dezincing apparatus 40 so that an iron component obtained during this treatment can be used as a raw material in the melting furnace 1. Zinc separated as a result of the dezincing treatment is utilized in the manufacture of bare metal of zinc.

Figure 4:
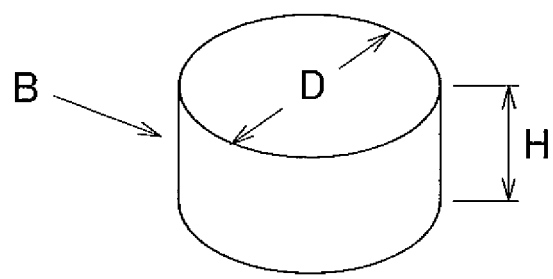
FIG. 4 is a perspective view showing an example of the solid body of the steelmaking dusts made by the solid body making method referred to above.

The pellets 11p are impregnated in a solidifying apparatus 6 with water just before the pellets 11p are molded, and are then solidified by the solidifying apparatus 6 into briquettes B. The briquettes B are in the form of, for example, such a cylindrical solid body as shown in FIG. 4, having a diameter D of, for example, about 150 mm and a height of about 120 mm. Those briquettes B are preferably of a size having the diameter D within the range of 30 to 200 mm and a ratio (H/D) of the height H relative to the diameter D within the range of 30 to 150%.

The briquettes B so manufactured are charged again into the melting furnace 1 as a raw material.

The method for recycling the steelmaking dusts described above includes those steps, which are repeated.

Figure 2:
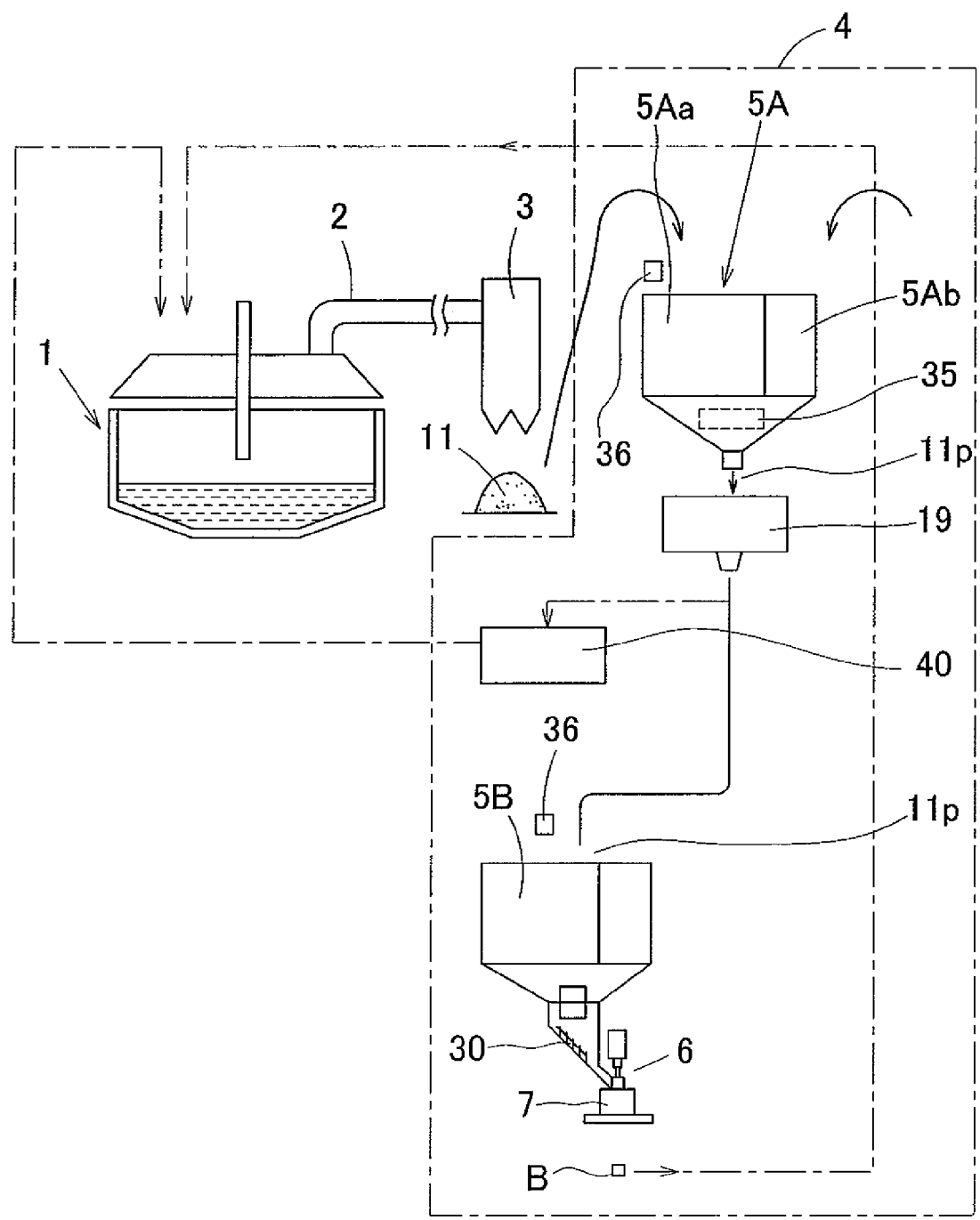
FIG. 2 is an explanatory diagram showing steps of a method for and an apparatus for making a solid body of the steelmaking dusts in the recycling method of the present invention.

FIG. 2 illustrates a schematic construction of various equipments used to perform the respective steps shown in FIG. 1. The steelmaking dusts 11 produced in the melting furnace 1 are introduced into the dust collector 3 through an exhaust duct 2 together with exhaust gases. The steelmaking dusts 11 in the exhaust gases are collected by the dust collector 3 and are subsequently discharged in the form of a powder. The steelmaking dusts 11 contain as a principal component iron and oxides of iron. The steelmaking dusts 11 so discharged from the dust collector 3 are subsequently charged into a first hopper 5A forming a part of dust solid body making apparatus 4.

The first hopper 5A includes a steelmaking dust container 5Aa and a carbon powder container 5Ab, and the steelmaking dusts 11 are charged into the steelmaking dust container 5Aa. The powder (not shown) containing carbon as a principal component is charged into the carbon powder container 5Ab through a channel separate from that for the steelmaking dusts 11. The powder containing carbon as a principal component may not be always limited to a pure powder of carbon, but may be graphite.

The first hopper 5A also includes a mixing portion 35 for mixing the steelmaking dusts 11 within the steelmaking dust container 5Aa and the carbon powder within the carbon powder container 5Ab in a predetermined mixing ratio. The mixing ratio referred to above is so chosen that the content of carbon relative to the total thereof may fall within the range of 15 to 20 wt %. The mixing portion 35 may include, for example, a mixing chamber and a screw conveyor or a mixing blade assembly.

The mixed granules discharged from the first hopper 5A and containing the steelmaking dusts 11 and the powder containing carbon as a principal component are supplied to the granulating machine 19. The granulating machine 19 granulates the powder mix to provide the pellets 11$p$. The pellets 11$p$ are granulated mixture of the steelmaking dusts 11 with the powder containing carbon as a principal component. The granulating machine 19 may be of, for example, a type, in which a proper amount of water is added to the powder within a drum (not shown), then rotating, to coagulate the powder so that spherical granules can be formed. The pellets 11$p$ contain a water content which is preferably within the range of 8 to 10 wt %.

The pellets 11$p$ of the steelmaking dusts 11 so granulated by the granulating machine 19 are, when recycle of returning the briquettes B to the melting furnace 1 is repeated with the zinc concentrate increased consequently, charged into the dezincing apparatus 40 to remove zinc therefrom. This dezincing treatment is carried out while the zinc concentration is enhanced. The zinc separated as a result of the dezincing treatment is discharged and is then used for the manufacture of zinc bare metal or the like.

A second hopper 5B includes a supply section (not shown) and the pellets 11$p$ of the steelmaking dusts 11 are charged into the solidifying apparatus 6 through the second hopper 5B. The solidifying apparatus 6 is a mechanism for solidifying the pellets 11$p$ of the steelmaking dusts 11 into briquettes B and includes a mold assembly 7.

The second hopper 5B or the solidifying apparatus 6 is provided with a forced filling apparatus 30 for forcibly filling the mold assembly 7 with the steelmaking dusts 11 supplied from the second hopper 5B.

The briquettes B so formed by the solidifying apparatus 6 are transported by a transport system (not shown) and are again supplied into the melting furnace 1.

Figure 3:
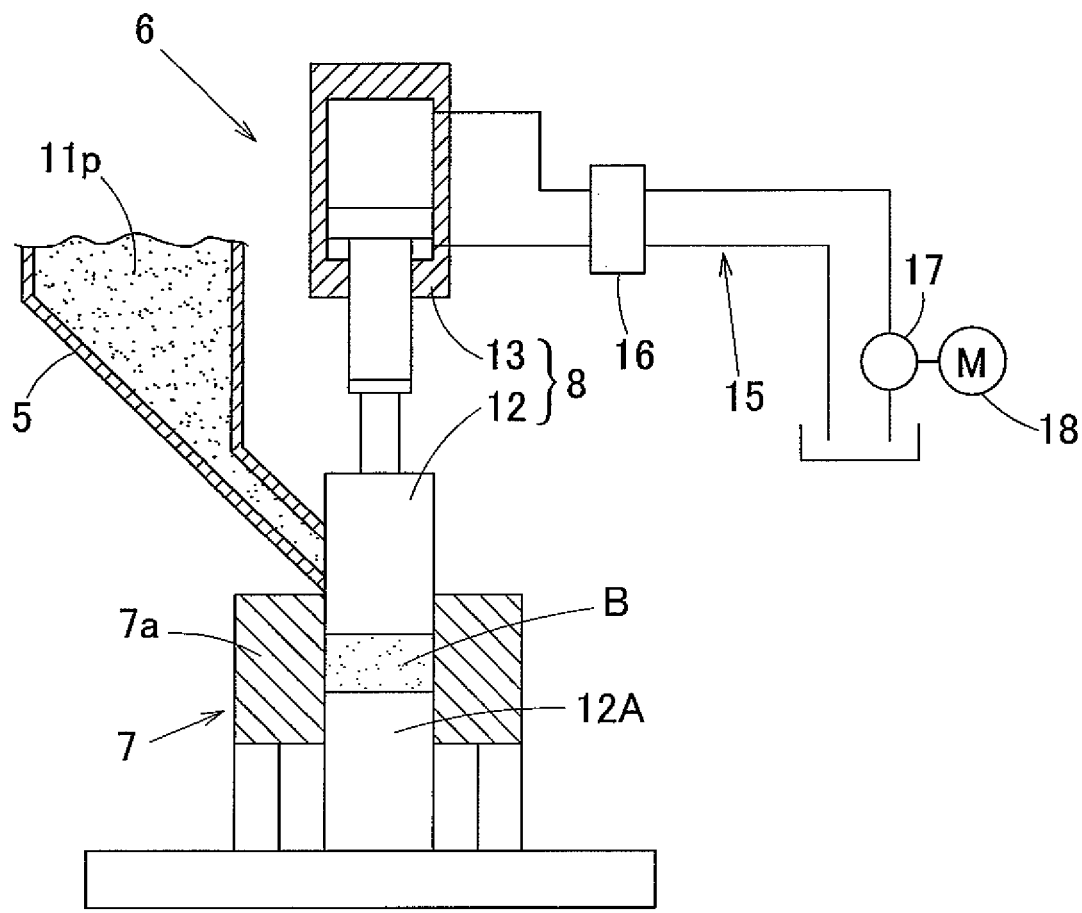
FIG. 3 is an enlarged sectional view showing an important portion of the apparatus for making the solid body of the steelmaking dusts.

As shown in FIG. 3 on an enlarged scale, the solidifying apparatus 6 includes, in addition to the mold assembly 7 for molding under pressure the steelmaking dusts 11, which have been charged thereinto from the second hopper 5B, a pressurizing mechanism 8 for applying a pressure to the mold assembly 7 for the molding under pressure, and a pressure control unit (not shown) for controlling the pressurizing mechanism 8 to enable the latter to exert a predetermined pressure.

The mold assembly 7 is of a shape similar to a vertical cylinder is chamber and is so shaped and so designed as to mold the pellets 11$p$ of the steelmaking dusts 11 to a round-sectioned cylindrical shape (that is, a shape of a cylindrical solid). The sectional shape thereof may be polygonal, in which case briquettes of a polygonal sectioned columnar shape can be formed. More specifically, the mold assembly 7 includes a cylindrical die 7$a$ and a plunger-like lid 12A inserted in a lower open end of the die 7$a$. The lid 12A is closed by a lid open/close mechanism (not shown) having a drive source. The lid 12A may be of a type sealing one end of the die 7$a$ without entering into the mold assembly 7. Also, the plunger-like lid 12A may be formed as an elevating mechanism (not shown) having a drive source.

The pressurizing mechanism 8 includes an elevatable plunger 12 advancing from above into the mold assembly 7 for compressing the pellets 11$p$ of the steelmaking dusts, and a pressing device 13 for driving the plunger 12 to move up and down. The pressing device 13 may be in the form of, for example, a hydraulic cylinder, the drive of which is controlled by a presser control mechanism (not shown). The pressing device 13 also includes a hydraulic circuit 15 for supplying an oil under pressure to the pressing device 13$a$, a switching valve 16 in the hydraulic circuit 15, a pump 17 and a motor 18 for the pump 17. The presser control mechanism controls the switching valve 16 and the motor 18. The pressing device 13 may be in the form of, for example, a motor and a rotary-to-linear movement motion translating mechanism (not shown) such as a ball screw for translating the drive of the motor into a linear movement, other than the hydraulic cylinder. Also, the pressing device 13 may be disposed on respective sides of the plunger 12 and the lid 12A to achieve the pressure control.

According to the foregoing recycling method, the recycle of the steelmaking dusts is carried out in the manner described hereinabove. In such case, the steelmaking dusts 11 are solidified to provide the briquettes B and, therefore, as compared with the case in which the dusts are reused in a powdery form as they stand, there is no problem associated with scattering thereof at the time when the dusts are charged into the melting furnace 1 and, also, as compared with the case in which the dusts are granulated to provide small briquettes, the handling is good because of a substantial size. Also, since the steelmaking dusts 11 are solidified to provide the briquettes B after granulation thereof, a high molding density can be obtained as compared with that exhibited when the steelmaking dusts 11 are charged in a powdery form as they stand and compacted in the mold assembly 7 under pressure, and, hence, even without a reinforcing agent such as, for example, a binder being used, the practically sufficiently acceptable strength of the briquettes B of the steelmaking dusts 11 can be obtained.

In particular, since the pellets 11$p$, formed by granulating a powdery material containing as a principal component the steelmaking dusts 11 and carbon that are mixed together are used as a raw material, there are advantages that heat efficiency in the melting furnace 1 can be improved by addition of the powdery material containing carbon as a principal component, and that the steelmaking dusts 11 can be charged into the mold assembly 7 in the form as granulated and can then be molded under pressure within the mold assembly 7. Because of this, with no additive employed if possible, a practically sufficient strength can be effectively available and it can lead to an improvement in heat efficiency of the melting furnace 1 at the time of reloading into the melting furnace 1.

Also, since water is impregnated before molding, the pellets 11$p$ can have their surfaces softened to such an extent that the pellets 11$p$ can easily deform when held under pressure and, in view of the fact that the bonding strength among the pellets 11$p$ increases, a favorable molding strength can be obtained.

In addition, in the case where as a raw material to be charged into the melting furnace 1, scrap of, for example, plated and galvanized steel sheets is used, zinc is preferentially concentrated in the dusts with the zinc concentration enhanced consequently, and the dezincing treatment is carried out at that time. By so doing, the dezincing treatment can be accomplished efficiently.

Because of those reasons discussed above, a recycling method, which is stable at a low cost, can be embodied and the amount of industrial wastes can be reduced.

The water content in the pellets 11$p$ will be discussed. Considering the result of test, it appears that during the solidification within the mold assembly 7, and when the granules 11$p$ behave to plastically deform within the mold assembly 7, water brings about an effect to reduce the friction among the powdery particles to facilitate the deformation. Such effect can be observable when the water content is not lower than 0.5 wt %, but if the water content falls within a region of water content exceeding 15 wt %, the water behaves as a liquid and, therefore, such water brings about an adverse effect to an improvement of the apparent density of the briquettes B. The water content of a sample, which has been formed by mixing the steelmaking dusts and the carbon powder (in a mixing ratio of 4:1 based on percent by weight) and granulating the mixture with the granulating machine to have a practically acceptable briquette strength, is within the range of 0.5 to 15 wt % and preferably within the range of 8 to 10 wt %.

The proper amount of carbon in the raw material for the briquettes B will now be discussed. Addition of a carbon material such as the carbon powder to the briquettes B used to recycle to the electric furnace, as hereinbefore described, is extremely important to increase the heat efficiency of the electric furnace. However, such addition of the carbon material may possibly impair the strength of the solidified bodies. On the other hand, even though the strength of the solidified bodies is impaired as a result of the addition of the carbon material, a high molding density can be obtained since the molding under pressure is carried out while the steelmaking dusts are supplied into the mold assembly 7 in the form as granulated and are then molded within the mold assembly 7, and as a result, even without any reinforcement material such as the binder being used, the briquettes B of a practically sufficient strength are available.

In view of the foregoing, the inventors of the present invention have found, as a result of investigation and verifying experiments, that an excellent moldability can be obtained even though the carbon has been added by the following method. That is, when manufacturing the pellets $11p$, the carbon material such as the carbon powder are added to the granulating machine 19 for granulating the steelmaking dusts 11 and subject to granulating together with the steelmaking dusts 11 while selecting the amount of carbon to be added to be equal to or smaller than 20 wt % of the pellets $11p$ prepared from the steelmaking dusts 11 and the powder containing carbon as a principal component. Also, selection of the proportion of the powder containing carbon as a principal component to be equal to be 15 wt % has revealed that an effect of increasing the heat efficiency of the melting furnace 1 can be obtained sufficiently as a result of the addition of the carbon.

It is to be noted that although in the foregoing embodiment the dezincing treatment has been shown and described as performed subsequent to the granulation of the steelmaking dusts 11, it may not be always limited thereto and may be carried out during the course from acquisition of the steelmaking dusts 11 out of the melting furnace 1 to the solidifying step.

What is claimed is:

1. A method for recycling steelmaking dusts, which comprises:
    a granulating step of mixing steelmaking dusts, containing as a principal component iron and oxides thereof produced during the steelmaking in a melting furnace, with water and a powder containing carbon as a principal component and granulating the resultant mixture to provide spherical mixed granules of 3 mm to 8 mm in diameter;
    a water impregnating step of immersing the mixed granules in a water to allow them to be impregnated with the water just before molding is performed on the mixed granules;
    a solidifying step of molding the water impregnated, mixed granules under pressure within a mold assembly to provide a solid body of the steelmaking dusts,
    a step of transporting the solid body of the steelmaking dusts as a raw material to be charged into the melting furnace;
    an enhancing step of increasing the concentration of zinc in the dust during a period from acquisition of the steelmaking dusts out of the melting furnace to the solidifying step; and
    a dezincing step of dezincing the dusts while the zinc concentration in the dusts is increased.

2. A method for recycling the steelmaking dusts as claimed in claim 1, in which the carbon content in the mixed granules is within the range of 15 to 20% by weight and the water content is within the range of 8 to 10%.

3. A method for recycling the steelmaking dusts as claimed in claim 1, in which the solid body is cylindrical and of a size having a diameter D within the range of 30 mm to 200 mm and a ratio of a height H relative to the diameter D within a range of 30% to 150%.

* * * * *